United States Patent
Wu

(10) Patent No.: US 9,471,873 B1
(45) Date of Patent: Oct. 18, 2016

(54) AUTOMATING USER PATTERNS ON A USER DEVICE

(71) Applicant: David Wu, Seattle, WA (US)

(72) Inventor: David Wu, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 395 days.

(21) Appl. No.: 13/623,675

(22) Filed: Sep. 20, 2012

(51) Int. Cl.
*G06N 5/00* (2006.01)
*G06N 5/02* (2006.01)
*G06N 5/04* (2006.01)

(52) U.S. Cl.
CPC ............... *G06N 5/025* (2013.01); *G06N 5/04* (2013.01)

(58) Field of Classification Search
CPC .............................. G06F 3/048; G06N 5/025
USPC ......................................................... 706/12
See application file for complete search history.

(56) References Cited

U.S. PATENT DOCUMENTS

| 5,561,722 A * | 10/1996 | Watari et al. ................. 382/209 |
| 2009/0024944 A1* | 1/2009 | Louch et al. ................. 715/765 |
| 2011/0106736 A1* | 5/2011 | Aharonson .......... G06Q 10/109 706/12 |

* cited by examiner

*Primary Examiner* — Stanley K Hill
*Assistant Examiner* — Ola Olude Afolabi
(74) *Attorney, Agent, or Firm* — Lowenstein Sandler LLP

(57) ABSTRACT

Methods and systems for automating user patterns on a user device are described. A user device receives data representing inputs to a user interface (UI) of the user device and system data associated with each of the inputs, wherein the system data comprises information describing an environment of the user device when the input to the UI was received. The user device then determines that a subset of the inputs to the UI and the system data associated with the subset of the inputs exceeds a threshold probability of matching a pattern of previously-identified UI inputs and system data associated with the previously-identified UI inputs. The user device then executes additional inputs to the UI to complete the matched pattern.

24 Claims, 7 Drawing Sheets

AUTOMATING USER PATTERNS ON A USER DEVICE

BACKGROUND

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like.

Users of these electronic devices typically utilize a small set of applications on the electronic devices in a consistent pattern. For example, each morning while waiting for a bus to work, a user may run a reader application for news, a public transportation application that notifies the user how far away the bus is, and an e-mail application to check the user's email. The user may establish an identifiable pattern of using these same applications at a same time and location on certain days of the week.

BRIEF DESCRIPTION OF THE DRAWINGS

The present disclosure will be understood more fully from the detailed description given below and from the accompanying drawings of various embodiments of the invention, which, however, should not be taken to limit the present disclosure to the specific embodiments, but are for explanation and understanding only.

DETAILED DESCRIPTION

Methods and systems for automating user patterns on a user device. A user device includes an event automation manager that captures user input to the user device via a user interface (UI). The user input may include UI inputs, such as keystrokes, touchscreen gestures, mouse inputs, voice commands, device movements and so on. The event automation manager analyzes these recent inputs to determine if the recent user inputs match a stored pattern of user inputs. When at least a portion of the stored pattern is detected, the user device offers to run the remainder of the pattern for the user. In one embodiment, the captured user inputs also contain other domains of information associated with the captured input, including a time of day, day of the week, weather, location, and so on. These other domains of information may contribute to detecting when, where, and under what circumstances a user has selected to perform his or her task. In some embodiments, the other domains of information may include information sent to the device from a remote server.

In one embodiment, the user device performs training on captured user input data to identify, on an on-going basis, patterns a user may undertake. Training may refer to the creation of a binary classifier. For example, in some embodiments, the user inputs are kept in a data store of the user device. The user device may then perform machine learning techniques across the data store to find statistically-significant patterns. In some embodiments, unsupervised learning techniques, such as k-means discovers a potential new pattern, it may prompt the user about the detection of potential "behavior pattern" and ask the user for feedback on whether the detected "behavior pattern" is real. If the user confirms the pattern, then it is added to a set of stored patterns for the user device. When the first few events of that pattern are then later detected, the user device may notify the user regarding detection of the beginning of the pattern and ask the user if he or she would like the user device to perform the remaining UI actions for the pattern. In some embodiments, the notification is provided in one of several ways. For example, a System Notification may appear in a System bar of the user device. The user may either click on the notification to finish the pattern, or they may ignore the notification altogether.

In some embodiments, the user may adjust sensitivity levels associated with detecting new patterns (and prompting the user whether these patterns should be added to the user device for monitoring) and detecting the initiation of stored patterns (and prompting the user regarding auto-completion of these patterns). With the use of thresholds representing sensitivity levels, the user device may reduce false positives to a level that is non-intrusive and/or acceptable to the user.

Figure 1:
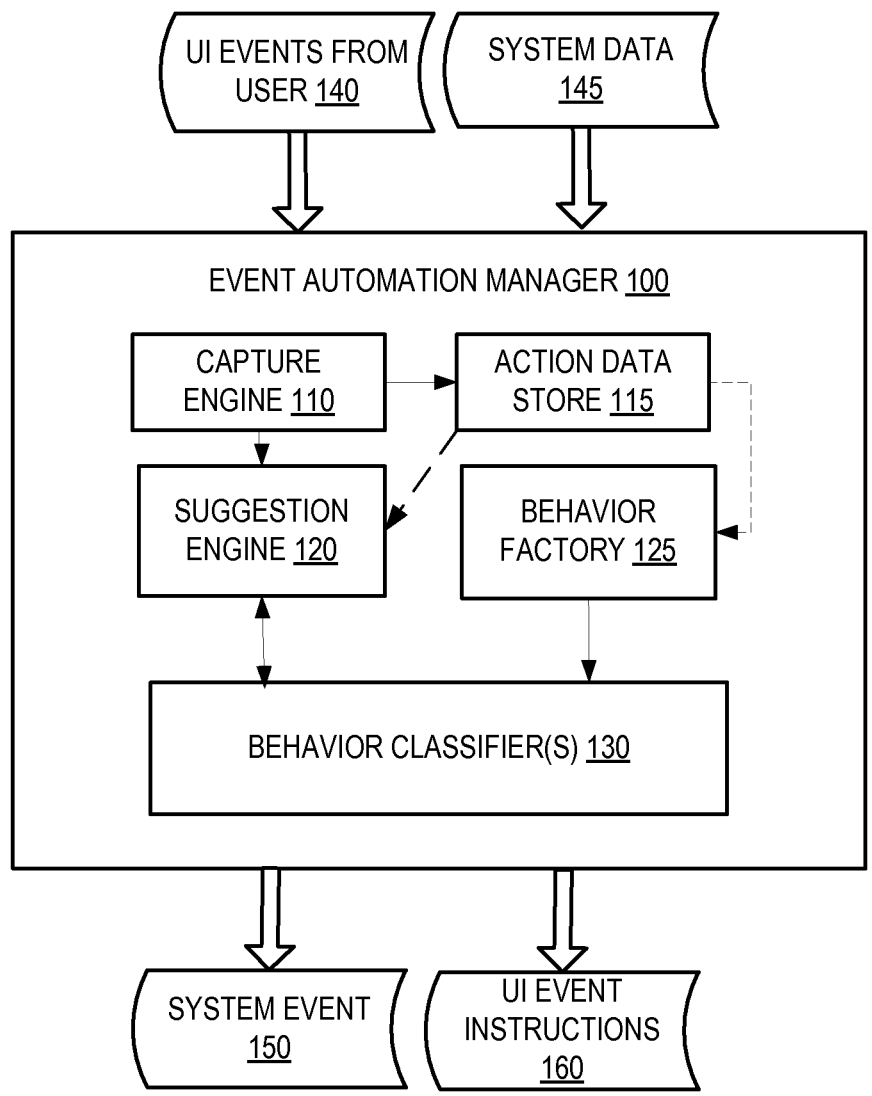
FIG. 1 is a block diagram of one embodiment of an event automation manager for automating user patterns in a user device.

FIG. 1 is a block diagram of one embodiment of an event automation manager 100 for automating user patterns in a user device. In one embodiment, the event automation manager 100 includes a capture engine 110, an action data store 115, a suggestion engine 120, a behavior factory 125 and a behavior classifier 130. In one embodiment, the event automation engine is part of a user device, as described with respect to FIG. 2 below. In other embodiments, the event automation engine is remote from the user device, such as part of a server device communicably coupled to the user device via a network, as described with respect to FIG. 7 below. In one embodiment, event automation manager is a service provided by an operating system (OS) of a device.

In one embodiment, event automation engine 100 receives user interface (UI) events 140 generated by a user. In one embodiment, the UI events include, but are not limited to, touchscreen gestures, keyboard inputs, mouse inputs, vocal commands, and rotational movements to the user device. The UI events may correspond to UI inputs and/or to application-level inputs (such as starting or stopping an application on the user device). In some embodiments, device drivers, device services, and other OS services of the user device register the UI inputs and communicate the UI inputs to the event automation manager 100.

In further embodiments, system data 145 associated with the UI events is also transmitted to the event automation manager 100. System data 145 can be information associated with the UI events (or maybe even the device itself) that is used help characterize the context in which the UI event was received. The system data 145 may include, but is not limited to, a time of the day the UI event occurred, a day of the week the UI event occurred, a location of the user device when the UI event occurred, weather in the location of the user device when the UI event occurred, an orientation of the user device when the UI event occurred, and so on. The system data 145 may be provided by devices and/or sensors associated with the user device, such as a global position system (GPS) unit, a clock, a weather service, a motion-detecting sensor, or a light-detecting sensor, to name a few examples. In some embodiments, localized information might also be sent to the device from a remote server (not shown). Such information may include weather information, traffic alerts, news bulletins, and so on.

In one embodiment, the capture engine 110 receives data representing the UI inputs 140 and system data 145, and sends this received data to both the action data store 115 and the suggestion engine 120. The action data store 115 may be a file system, database or other data management layer resident on one or more data storage devices such as a disk drive, RAM, ROM, etc. In one embodiment, the behavior factory 125 accesses the action data store 115 for purposes of user pattern identification. The behavior factory 125 may be a daemon that periodically runs machine learning across the action datastore 115 to identify statistically significant patterns within the data of the action data store 115. A daemon may be a computer program that runs as a background process, rather than being under the direct control of an interactive user. In one embodiment, the behavior factory 125 may use unsupervised learning techniques (such as k-means clustering) to discover the statistically-significant patterns.

In some embodiments, the behavior factory 125 applies a smoothing function to the UI input data 140 and its associated system data 145 maintained in the action data store 115. A smoothing function is an approximating function that attempts to capture important patterns in the data, while leaving out noise or other fine-scale structures/rapid phenomena. An example of a smoothing function would be a Gaussian filter. A Gaussian filter can be applied to an input signal via a convolution. The smoothing function may apply a probability distribution to a specific UI input in a pattern so that UI events that are "close to", but not an exact match to the UI input of a pattern may trigger detection of the pattern. For example, a XY coordinate of a location of a user's touch on the user device touchscreen may not be in the exact same X'Y' coordinate of a location of a stored UI input associated with a pattern. However, a touch at an XY coordinate that is nearby the X'Y' coordinate for the stored UI input for the pattern can be encompassed by a probability distribution of a smoothing function and thereby trigger detection of the pattern.

In some embodiments, when a statistically significant pattern is found by the behavior factory 125, a new behavior classifier 130 is created for that pattern. In embodiments of the implementation, a behavior classifier 130 can include any type of model (mathematical or computational) that is configured or trained to detect a user input pattern. In one embodiment, the event automation manager 100 presents the pattern to the user and asks for confirmation of the pattern before creating the new behavior classifier 130. In other embodiments, the behavior factory 125 creates the new behavior classifier 130 for the pattern without consulting the user. In some embodiments, the behavior factory 125 utilizes machine learning techniques to create the new behavior classifier 130 to represent a new pattern. The machine learning techniques may identify statistically significant patterns within the action data store. In one embodiment, unsupervised learning techniques, such as k-means clustering, may be used to discover the statistically-significant patterns that are represented in the new behavior classifier(s) 130.

In one embodiment, a behavior classifier 130 may include, but is not limited to, a support vector machine (SVM), a neural network, a logistic regression classifier, and an ensemble classifier. The behavior classifier 130 provides a probabilistic determination that returns a value between zero and one, which can then be used in a threshold analysis (described further below). For example, one type of logistic regression classifier is a weighted probability function. The weighted probability function describes the relative likelihood for a random variable to take on a given value. In the context of determining whether a UI input pattern matches a stored pattern, each possible UI event would be associated with a variable in the weighted probability function. The probability for the random variable to fall within a particular region is given by the integral of the variable's density over the region. As a result, when applying the weighted probability function to a set of received UI input, the weighted probability function will output a value that represents how close (in terms of probability) that the provided UI inputs are the same as a previously-identified pattern that the weighted probability function is trained on.

The suggestion engine 120 may use the behavior classifier(s) 130 to determine if new received UI inputs 140 and associated system data 145 correspond with a discovered pattern, and to execute a remainder of a pattern based on the amount of certainty that the UI inputs indicate the pattern. When a new action is given to the behavior classifier(s) 130 maintained by event automation manager 100, each behavior classifier determines whether a set of recently executed actions (e.g., actions within the last X minutes or the last X actions) are part (e.g., the beginnings) of a stored user pattern. In one embodiment, a history of UI/system events are cached by the suggestion engine 120 and sent to the behavior classifier(s) 130 for pattern analysis.

In one embodiment, suggestion engine 120 utilizes a sensitivity level in determining whether received UI inputs match a stored pattern. The sensitivity level acts as a threshold to apply to an output of the behavior classifier(s) 130. If an output of a behavior classifier 130 is above the sensitivity threshold, then the analyzed UI inputs 140 are considered as highly certain to match a stored pattern. The event automation manager 100 may then subsequently prompt 150 the user about detection of the pattern and whether the user would like the user device to finish running the pattern on the user's behalf. In one embodiment, the event automation manager 100 may use a system event that is displayed on the screen (e.g., in a taskbar or other notification area) of the user device to notify the user of the detected pattern and query the user about auto-completion of the pattern. In some embodiments, a user may adjust the sensitivity level. This allows the user to adjust the threshold so that he or she can control how often they are prompted.

In one embodiment, if the user agrees to allow the device to auto-complete the remainder of the pattern, then the event automation manager 100 issues UI event instructions 160 to device drivers, device services and/or other OS services of the user device that cause the remainder of the UI inputs in the pattern to occur. The remainder of the UI inputs are then executed without the interaction of the user. Providing the above-described detection and automation of user patterns on a user device reduces the performance of repetitive tasks by a user and makes navigation through a user device easier and simpler.

Figure 2:
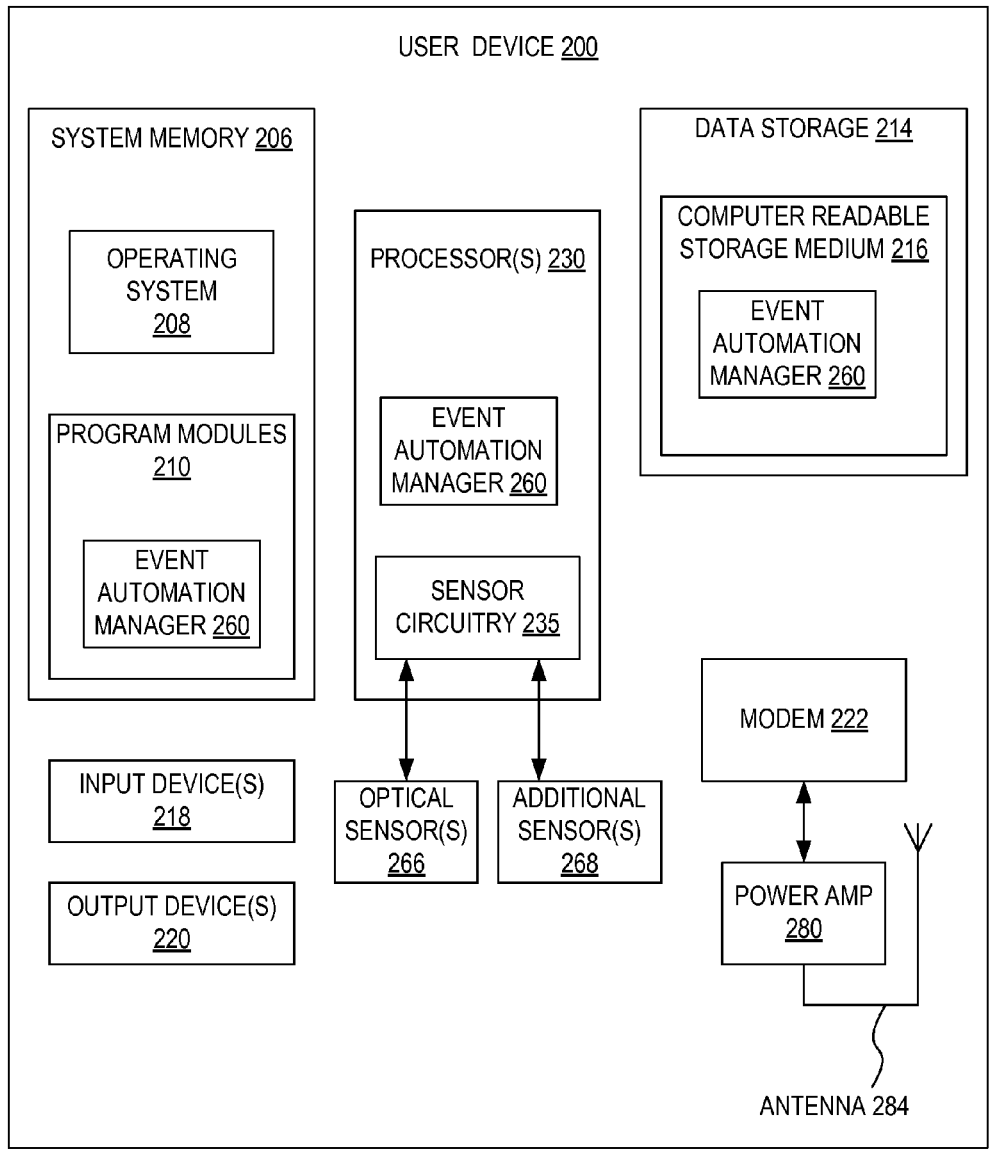
FIG. 2 is a block diagram illustrating an exemplary user device that performs automation of user patterns according to an embodiment of the invention.

FIG. 2 is a block diagram illustrating an exemplary user device 200 that performs automation of user patterns according to an embodiment of the invention. The user device 200 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 200 includes one or more processing devices or processors 230, such as one or more CPUs, microcontrollers, field programmable gate arrays, or other types of processing devices. The user device 200 also includes system memory 206, which may correspond to any combination of volatile and/or non-volatile storage mechanisms. The system memory 206 stores information which provides an operating system component 208, various program modules 210 such as event automation manager 260 and/or other components. In one embodiment, event automation manager 260 is the same as event automation manager 100 described with respect to FIG. 1. The user device 200 performs functions by using the processor(s) 230 to execute instructions provided by the system memory 206.

The user device 200 also includes a data storage device 214 that may be composed of one or more types of removable storage and/or one or more types of non-removable storage. The data storage device 214 includes a computer-readable storage medium 216 on which is stored one or more sets of instructions embodying any one or more of the methodologies or functions described herein. As shown, instructions for the event automation manager 260 may reside, completely or at least partially, within the computer readable storage medium 216, system memory 206 and/or within the processor(s) 230 during execution thereof by the user device 200, the system memory 206 and the processor(s) 230 also constituting computer-readable media. The user device 200 may also include one or more input devices 218 (keyboard, mouse device, specialized selection keys, etc.) and one or more output devices 220 (displays, printers, audio output mechanisms, etc.). In one embodiment, input devices 218 are the medium through which a user generates the UI events 140 described with respect to FIG. 1.

The user device 200 further includes a wireless modem 222 to allow the user device 200 to communicate via a wireless network (e.g., such as provided by the wireless communication system) and/or with other computing devices, such as remote computers, the item providing system, online book stores, electronic catalogs for libraries, and so forth. The wireless modem 222 may allow the user device 200 to handle both voice and non-voice communications (such as communications for text messages, media messages, media downloads, web browsing, etc.) with the wireless communication system 110. The wireless modem 222 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc.

The wireless modem 222 may generate signals and send these signals to power amplifier (amp) 280 for amplification, after which they are wirelessly transmitted via antenna 284. In addition to sending data, antenna 284 also receives data, which is sent to wireless modem 222 and transferred to processor(s) 230.

In one embodiment, user device 200 includes an optical sensor 266. The optical sensor 266 may be a low resolution camera (e.g., having 0.2 or 0.3 Megapixels) that takes images (e.g., of a user's eyes) on a periodic basis. Alternatively, the optical sensor 266 may have a higher resolution, such as 1 Megapixel up to 10 or more Megapixels. The optical sensor 266 may be positioned such that images are taken of a user's face while the user holds the user device 200 in front of his face in a standard reading position. Therefore, the optical sensor 266 may be used to track user eye movement during reading.

In one embodiment, user device 200 includes one or more additional sensors 268 such as a physical contact sensor, close proximity sensors, or motion sensors. The sensors 268 can detect the presence of human body parts, and convey information regarding the detected presence to processor(s) 230. In one embodiment, the sensors 268 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 268 may also be optical (e.g., infrared) sensors that use an emitter and receiver pair to detect the presence of opaque objects.

Alternatively, the sensors 268 may be inductive sensors, which include an inductive loop. When the presence of a human body part (or metal object) is brought close to the inductive sensor, an induction of the inductive loop changes, causing the human body part to be detected. Alternatively, the sensors 268 may be ultrasonic sensors that emit an ultrasonic signal and measure a time duration between when a signal is transmitted and the reflection of that signal received (a.k.a., flight response). The sensors 268 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 268 include a motion sensor, such as an accelerometer or one or more gyroscopes. The user device 200 may use motion data from motion sensors to determine whether a user is holding the user device 200. For example, if the user device 200 experiences constant minor accelerations, it may be determined that the user device 200 is being held in a user's hand. Additionally, if the user device 200 is at a particular angle (detectable based on acceleration readings from an accelerometer), it may be determined that the user device 200 is being rested on a user's leg during reading.

The processor(s) 230 may include sensor circuitry 235 (e.g., sensor device drivers) that enables the processor(s) 230 to interpret signals received from the optical sensor(s) 266 and/or additional sensors 268. In one embodiment, the optical sensors 266 and/or additional sensors 268 output raw sensor data. In another embodiment, the optical sensors 266 and/or additional sensors 268 output fully processed signals to the processor(s) 230. For example, the additional sensors 268 may output a user contact/no user contact signal using a single line interface or a multi-line interface.

In another embodiment, the additional sensors 268 output, for example, positional data and/or object presence data (e.g., of a human body part) to the processors 230 without first processing the data. In either instance, the processors 230 may use the sensor circuitry 235 to process and/or interpret the received data. If data is received from multiple sensors, processing the data may include averaging the data, identifying a maximum from the data, or otherwise combining the data from the multiple sensors.

In one embodiment, sensors 266, 268 are used to capture system data 145 associated with UI events 140 generated by a user, as described above with respect to FIG. 1. In some embodiments, the event automation manager 260 may register as a listener with sensor circuitry 235, so that when a UI event is received at sensors 266, 268, the sensor circuitry registers associated system data captured by sensors 266, 268 with the event automation agent 260.

Figure 3:
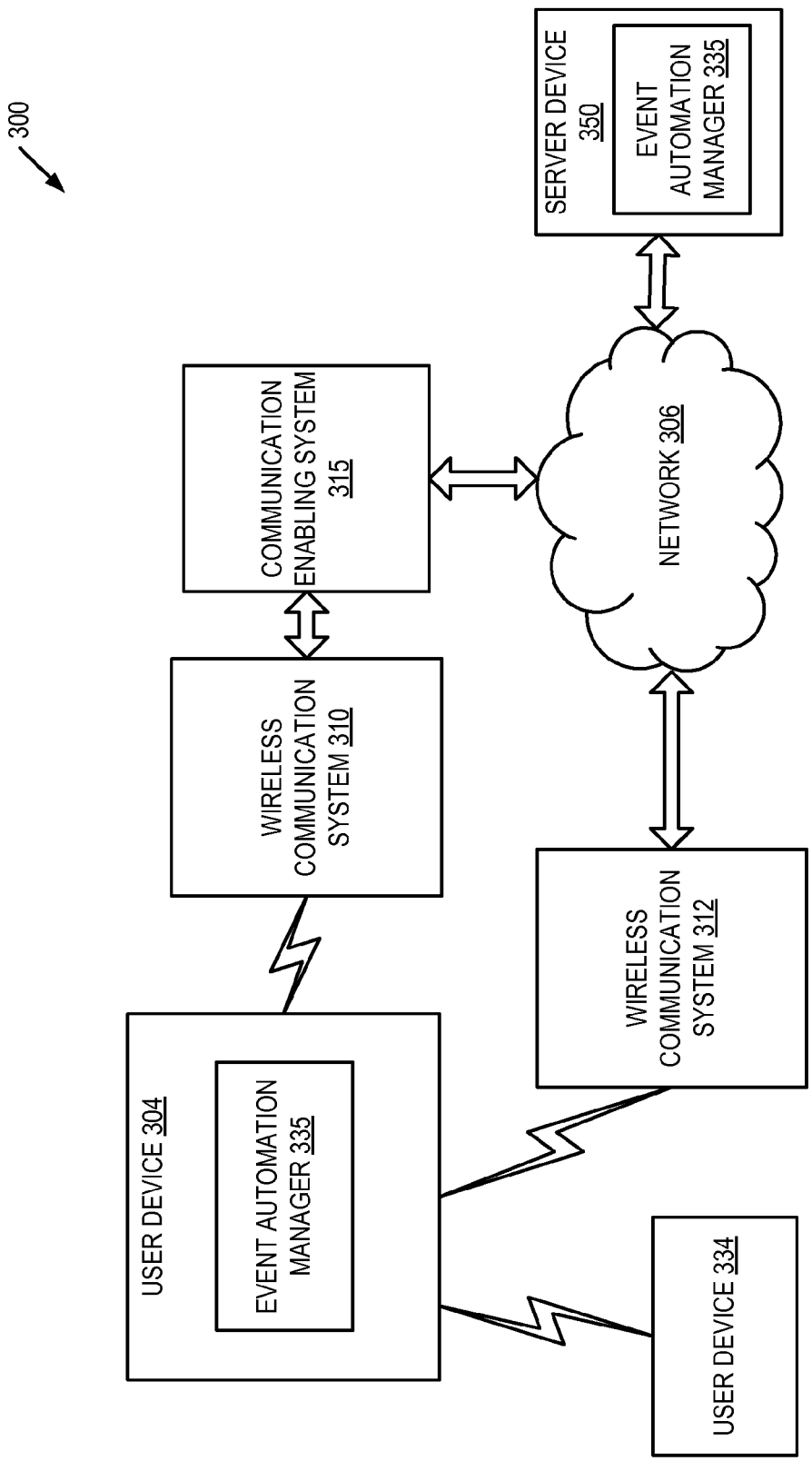
FIG. 3 is a block diagram of an exemplary network architecture in which embodiments of an event automation manager may operate.

FIG. 3 is a block diagram of an exemplary network architecture 300 in which embodiments of an event automation manager 335 may operate. The network architecture 100 may include server device 350 and one or more user devices 304 capable of communicating with the server device 320 via a network 306 (e.g., public network such as the Internet or private network such as a local area network (LAN)).

The user devices 304 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 104 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server device 350 and the user devices 304 deliver and/or receive items, upgrades, and/or other information via the network 306. For example, the user devices 304 may download or receive items from the server device 350. The server device 350 also receives various requests, instructions and other data from the user devices 304 via the network 306. The server device 350 may include one or more machines (e.g., one or more server computer systems, routers, gateways, etc.) that have processing and storage capabilities to provide the above functionality.

Communication between the server device 350 and the user device 304 may be enabled via any communication infrastructure. One example of such an infrastructure includes a combination of a wide area network (WAN) and wireless infrastructure, which allows a user to use the user device 304 to purchase items and consume items without being tethered to the server device 350 via hardwired links. The wireless infrastructure may be provided by one or multiple wireless communications systems, such as wireless communications system 310 and wireless communication system 312. One of the wireless communication systems 310, 312 may be a wireless fidelity (WiFi) hotspot connected with the network 306. Another of the wireless communication systems 310, 312 may be a wireless carrier system that can be implemented using various data processing equipment, communication towers, etc. Alternatively, or in addition, the wireless carrier system may rely on satellite technology to exchange information with the user device 304.

The communication infrastructure may also include a communication-enabling system 315 that serves as an intermediary in passing information between the server device 350 and the wireless communication system 310. The communication-enabling system 315 may communicate with the wireless communication system 310 (e.g., a wireless carrier) via a dedicated channel, and may communicate with the server device 350 via a non-dedicated communication mechanism, e.g., a public Wide Area Network (WAN) such as the Internet.

In one embodiment, the user device 304 includes an event automation manager 335 to detect user patterns of UI inputs and automate performance of the UI inputs of the user pattern. Event automation manager 335 may correspond to event automation manager 100 described with respect to FIG. 1.

In some embodiments, the event automation manager 335 is not part of the user device 304 and is instead remotely executed by the server device 350. Server device 350 may receive the user's UI input data and associated system data from the user device 304 and process this data for user pattern detection and automation at the event automation manager 335 executed by server device 350. Server device may then send system events (e.g., prompts and queries to a user of the user device 304) and UI input instructions (to execute the user pattern) back to the user device 304 when any patterns are detected. In some embodiments, functionality of the event automation manager 335 may be jointly provided by a combination of the user device 304 and the server device 350. For example, the event automation manager 335 on server device 350 may analyze new UI inputs/system data and generate new behavior classifiers from this data, while the event automation manager 335 on the user device 304 applies these generated behavior classifiers to new UI input data at the user device 304.

Figure 4:
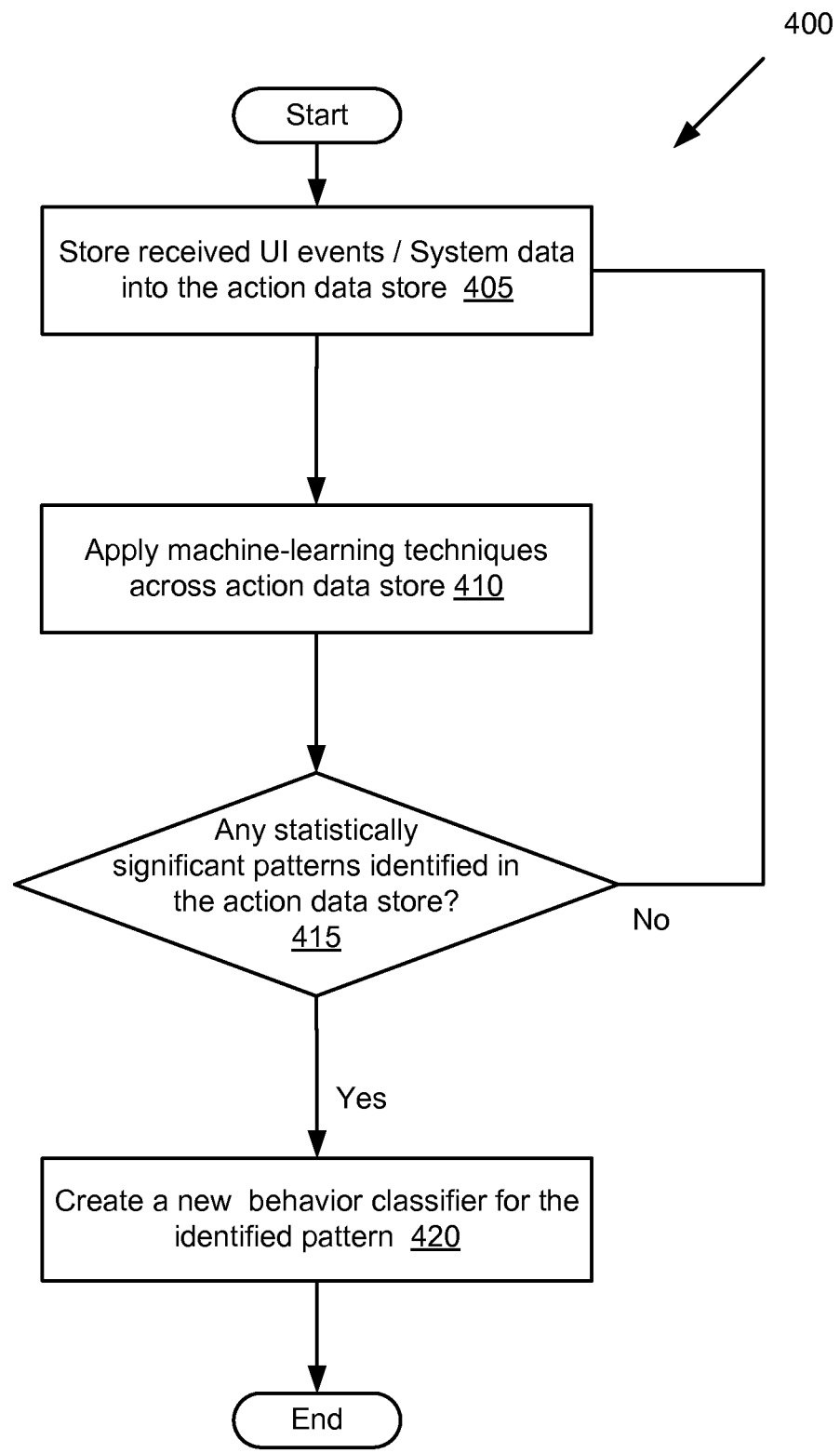
FIG. 4 is a flow diagram illustrating a UI input pattern creation method according to an embodiment of the invention.

FIG. 4 is a flow diagram illustrating a UI input pattern creation method 400, according to an embodiment of the invention. The method 400 may be performed by processing logic that comprises hardware (e.g., circuitry, dedicated logic, programmable logic, microcode, etc.), software, firmware, or a combination thereof. The processing logic is configured to analyze user UI input data and associated system data to determine new patterns performed by a user of the user device. In one embodiment, method 400 may be performed by event automation manager 100, as shown in FIG. 1.

Method 400 begins at block 405 where newly-received UI events and system data associated with the UI events are stored in an action data store. In one embodiment, the UI events include, but are not limited to, touchscreen gestures, keyboard inputs, mouse inputs, vocal commands and rotational movements to the user device. Device drivers, device services and other OS services of the user device may register the UI inputs and communicate the UI inputs to the event automation manager. The system data associated with the UI events may include, but is not limited to, a time of the day, a day of the week, a location of the user device, current weather, and so on. The system data 145 may be provided by devices and sensors associated with the device, such as a global position system (GPS) unit, a clock, a weather service, a motion sensor or a light-detecting sensor, to name a few examples.

At block 410, machine learning techniques are applied to the action data store. In one embodiment, the machine learning techniques identify statistically significant patterns within the action data store. In one embodiment, unsupervised learning techniques, such as k-means clustering, may be used to discover the statistically-significant patterns. In one embodiment, the machine learning techniques are applied at pre-determined time intervals set by an administrator of the event automation manager or by a user of the device. In other embodiments, the machine learning techniques are applied each time a new UI event is received by the device.

Then, at decision block 415, processing logic determines whether any statistically significant patterns were identified in the action data store. If not, then method 400 returns to block 405 to continue receiving and storing new UI events and associated system data with the action data store. If one or more statistically significant patterns are identified in the action data store, then method 400 proceeds to block 420 where a new behavior classifier for the identified pattern is created.

In one embodiment, a user of the user device is notified about the identified pattern information in order to receive the user's confirmation for creating the new behavior classifier. In other embodiments, the new behavior classifier is created without the user's confirmation. The behavior classifier may include, but is not limited to, a support vector machine (SVM), a neural network, a logistic regression classifier, and an ensemble classifier. The behavior classifier 130 provides a probabilistic determination that returns a value between zero and one.

Figure 5:
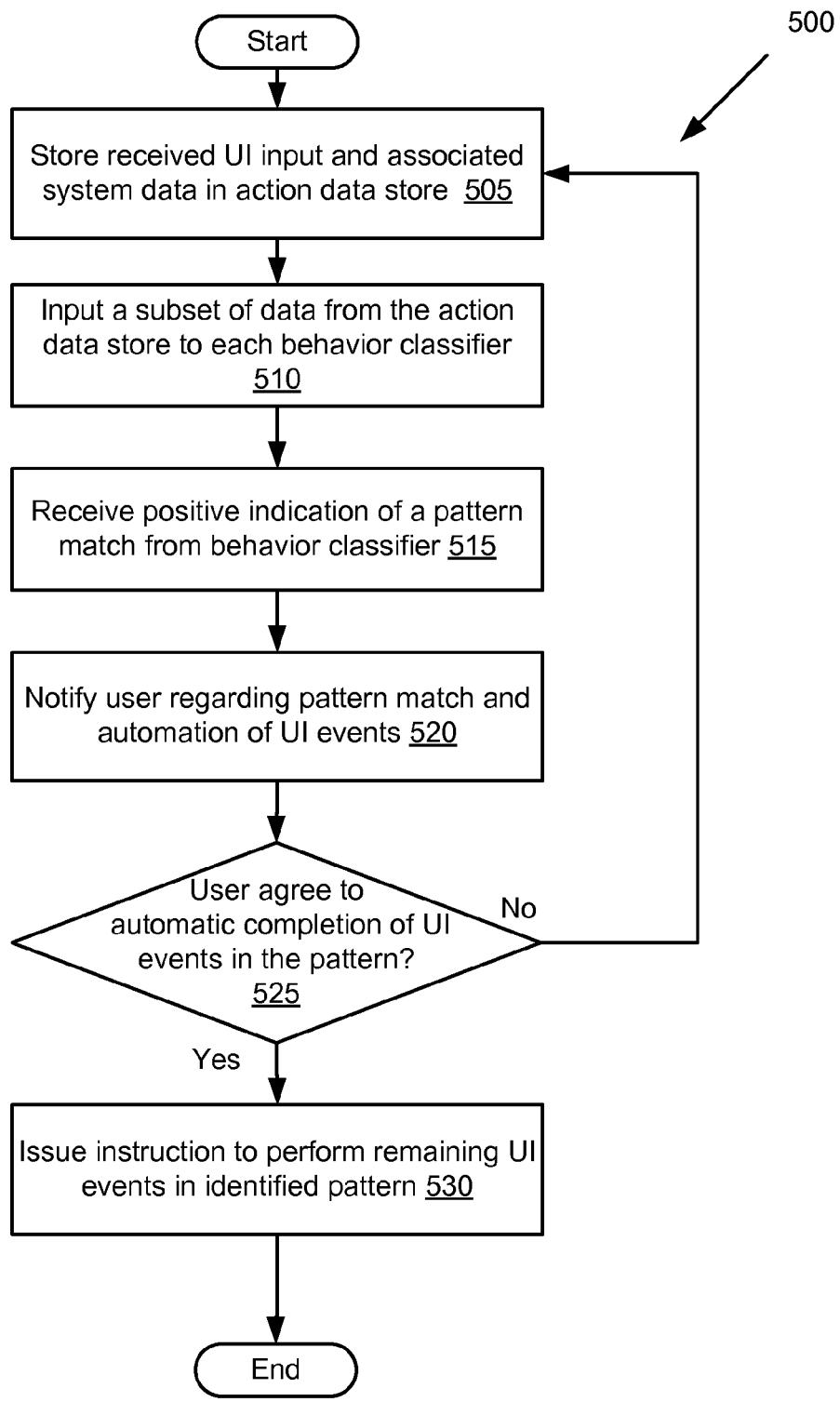
FIG. 5 is a flow diagram illustrating a UI input pattern detection and automatic completion method according to an embodiment of the invention.

FIG. 5 is a flow diagram illustrating a UI input pattern detection and automatic completion method 500, according to an embodiment of the invention. The method 500 may be performed by processing logic that comprises hardware (e.g., circuitry, dedicated logic, programmable logic, microcode, etc.), software, firmware, or a combination thereof. The processing logic is configured to detect a part (e.g., the initialization) of a user pattern based on UI inputs from the user, and automatically complete the remainder of the pattern upon user approval. In one embodiment, method 500 may be performed by event automation manager 100, as shown in FIG. 1.

Method 500 begins at block 505 where newly-received UI input and system data associated with the UI input is stored in an action data store. In one embodiment, the UI events include, but are not limited to, touchscreen gestures, keyboard inputs, mouse inputs, vocal commands and rotational movements to the user device. Device drivers, device services and other OS services of the user device may register the UI inputs and communicate the UI inputs to the event automation manager. The system data associated with the UI events may include, but is not limited to, a time of the day, a day of the week, a location of the user device, current weather, and so on. The system data 145 may be provided by devices and sensors associated with the device, such as a global position system (GPS) unit, a clock, a weather service, a motion sensor or a light-detecting sensor, to name a few examples.

Then, at block 510, a subset of the action data store is inputted to each behavior classifier maintained by the event automation manager. In one embodiment, the subset is the UI inputs and their associated system data that has been received at the action data store within the last X minutes, where X may be programmed by an administrator of the event automation manager or by a user of the user device. In other embodiment, the subset may be the last X entries received at the action data store, where X may be programmed by an administrator of the event automation manager or by a user of the user device.

At block 515, a positive indication of a pattern match is received from one of the behavior classifiers. Subsequently, at block 520, a user of the user device is notified regarding the pattern match and whether the user would like the rest of the pattern automatically completed by the user device. In one embodiment, a system event may appear in a system tray of the user device that notifies the user of the pattern match. Once the user opens the system event, he or she receives information on the pattern that the event automation manager has detected, and also is prompted to confirm whether the remainder of the pattern should be auto-completed by the user device.

At decision block 525, processing logic determines whether the user agreed to automatic completion of the detected pattern. If the user indicated that the pattern should not be auto-completed, then method 500 returns to block 505 where processing logic continues to receive and store UI inputs and associated system data. On the other hand, if the user indicated that the detected pattern is to be auto-completed at decision block 525, then method 500 continues to block 530 where processing logic issues instructions to perform the remaining UI events in the identified pattern. In one embodiment, the event automation manager issues UI instructions to device drivers, device services and/or other OS services of the user device that cause the remainder of the UI events in the pattern to occur. The remainder of the UI events then are performed without the interaction of the user.

Figure 6:
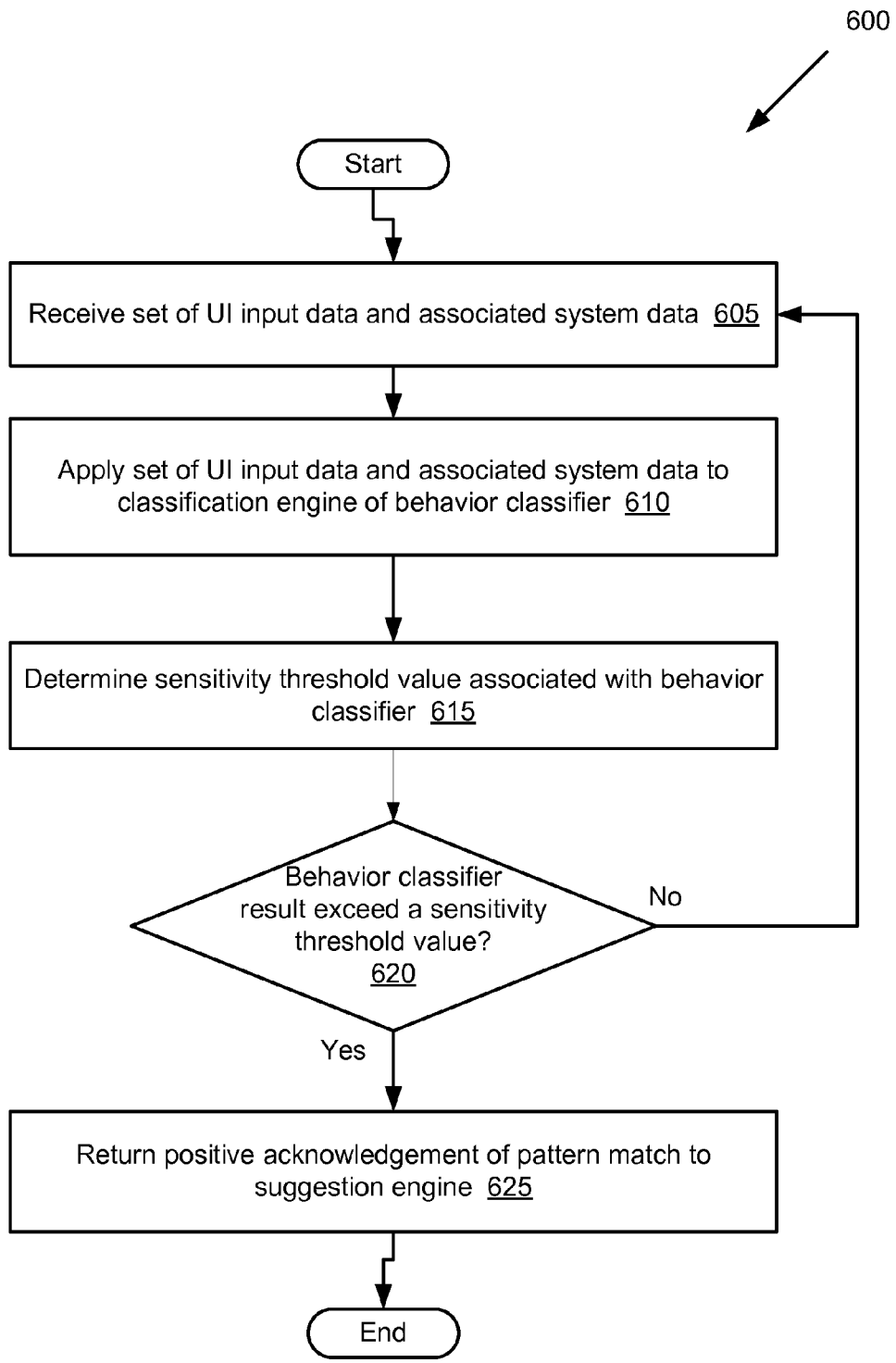
FIG. 6 is a flow diagram illustrating a UI input pattern detection method according to an embodiment of the invention.

FIG. 6 is a flow diagram illustrating a UI input pattern detection method 600, according to an embodiment of the invention. The method 600 may be performed by processing logic that comprises hardware (e.g., circuitry, dedicated logic, programmable logic, microcode, etc.), software, firmware, or a combination thereof. The processing logic is configured to match UI inputs from a user to stored patterns based on a sensitivity threshold value. In one embodiment, method 600 may be performed by event automation manager 100, as shown in FIG. 1.

Method 600 begins at block 605 where a set of UI input data and system data associated with the UI input data is received. In one embodiment the set of UI input data and associated system data is a subset of data in an action data store of the event automation manager. In one embodiment, the UI events include, but are not limited to, touchscreen gestures, keyboard inputs, mouse inputs, vocal commands and rotational movements to the user device. Device drivers, device services and other OS services of the user device may register the UI inputs and communicate the UI inputs to the event automation manager. The system data associated with the UI events may include, but is not limited to, a time of the day, a day of the week, a location of the user device, current weather and so on. The system data 145 may be provided by devices and sensors associated with the device, such as a global position system (GPS) unit, a clock, a weather service, a motion sensor or a light-detecting sensor, to name a few examples. In addition, the system data may also be supplied by a remote server.

At block 610, the received set of UI input data and associated system data is applied to a classification engine of a behavior classifier. In one embodiment, a behavior classifier may include, but is not limited to, a support vector machine (SVM), a neural network, a logistic regression classifier, and an ensemble classifier. The classification engine of the behavior classifier is the algorithm that returns a probabilistic determination represented by a value between zero and one. For example, in the case of a logistic regression classifier, a weighted probability function may be utilized that describes the relative likelihood for a random variable to take on a given value. The probability for the random variable to fall within a particular region is given by the integral of the variable's density over the region.

At block 615, a sensitivity threshold value associated with the behavior classifier is determined. In one embodiment, the sensitivity threshold value acts as a programmable level of accountability for pattern detection. The sensitivity threshold value may be a default value programmed by an administrator or may be a user-specified value. The sensitivity threshold value may be the gatekeeper for determining when a user of the user device is contacted about auto-completion of a pattern. At decision block 620, it is determined whether the behavior classifier result exceeds the determined sensitivity threshold value.

If the result from the behavior classifier is below the sensitivity threshold value, then method 600 returns to block 605 to continue receiving new sets of UI inputs and associated system data. On the other hand, if the result from the behavior classifier exceeds (or in some cases, equals) the sensitivity threshold value, then method 600 proceeds to block 625 where a positive acknowledgement of a pattern match is returned to a suggestion engine of the event automation manager. The positive acknowledgment indicates to the event automation manager that the received UI inputs are considered as highly certain to match a known user pattern. The event automation manager may then prompt the user about the detection of the pattern and query the user whether he or she would like the user device to finish executing the pattern on the user's behalf.

Figure 7:
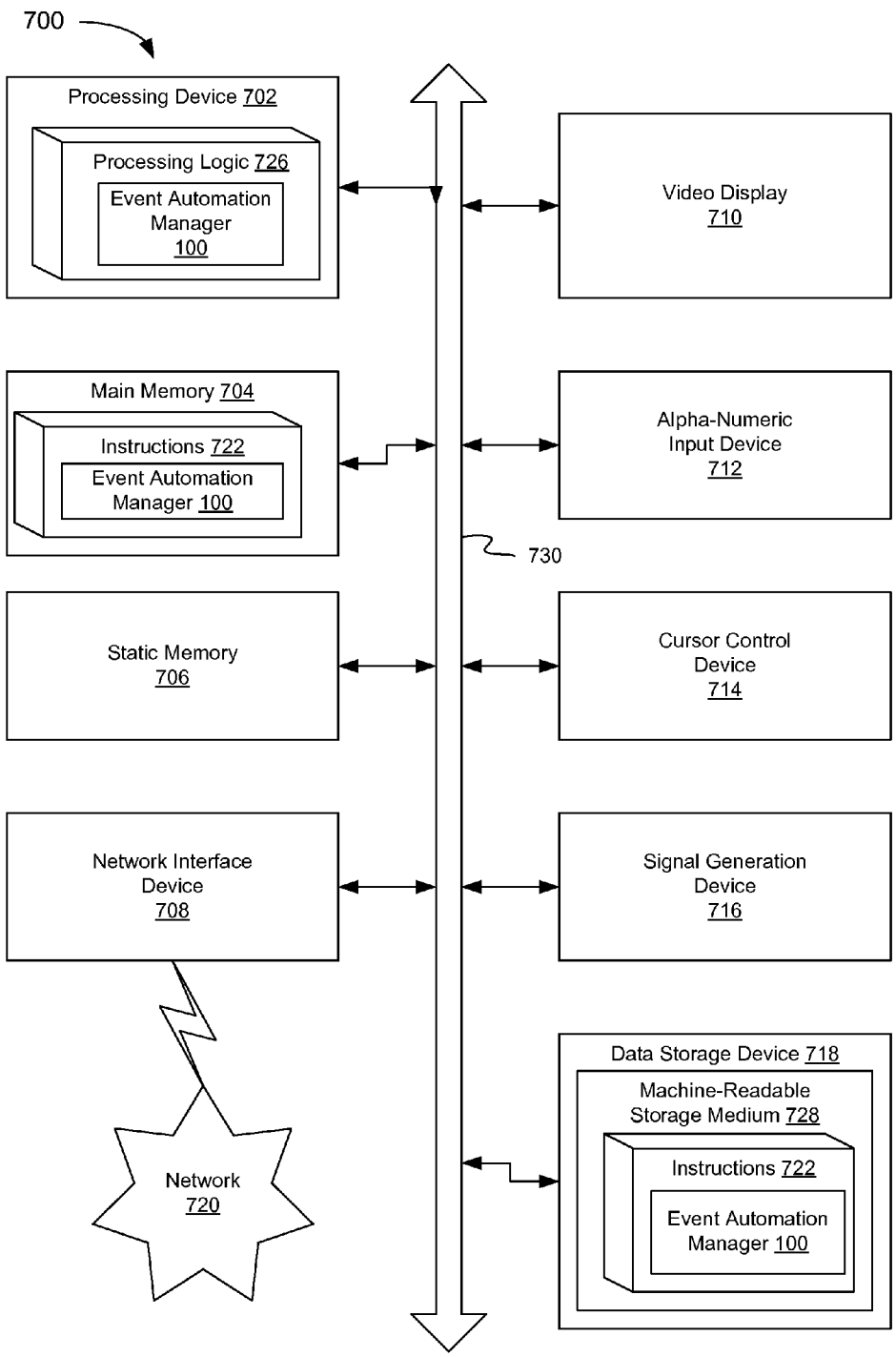
FIG. 7 illustrates a diagrammatic representation of a machine in the exemplary form of a computer system within which a set of instructions, for causing the machine to perform any one or more of the methodologies discussed herein, may be executed.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of digital content providing system 120.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of event automation manager 100 of FIG. 1) embodying any one or more of the methodologies or functions described herein. The instructions 722 may also reside, completely or at least partially, within the main memory 704 and/or within processing logic 726 of the processor 702 during execution thereof by the computer system 700, the main memory 704 and the processor 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "applying," "comparing," "querying," "causing," determining," "generating," "communicating," "receiving," "instructing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, embodiments of the invention are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. A method, implemented by a user device, comprising:
   receiving, by a processing device of the user device, data representing a set of user inputs to a user interface (UI) of the user device, wherein the set of inputs comprises a first input and a second input;
   receiving, by the processing device, first system data representing a first environment of the user device associated with when the first input to the UI was received;
   receiving, by the processing device, second system data representing a second environment of the user device associated with when the second input to the UI was received;
   analyzing at least a portion of the data, the first system data, and the second system data using a behavior classifier trained to determine a user input pattern associated with a plurality of UI inputs that were previously recorded by the user device;
   determining a probability of a pattern match between the user input pattern and a stored pattern;
   determining that the probability of the pattern match exceeds a threshold value;
   causing, via the UI, display of an option for automating a remainder of UI inputs in the user input pattern that have not been received by the user interface; and
   sending an instruction to one or more of a device driver, a device service, or an operating system service of the user device to cause additional inputs to the UI to occur to complete the stored pattern without interaction by the user.

2. The method of claim 1, wherein the first input comprises one or more of: an input to a touchscreen of the user device, an input to a keyboard of the user device, an input to a mouse of the user device, vocal command to a microphone of the user device or a movement sensed by an inertial sensor of the user device.

3. The method of claim 1, wherein the first system data comprises at least one of: a time of day the first input to the UI was received, a day of week the first input to the UI was received, a location of the user device when the first input to the UI was received, an orientation of the user device when the first input to the UI was received, or weather information for a location of the user device when the first input to the UI was received.

4. The method of claim 1, wherein the behavior classifier comprises a k-means clustering.

5. The method of claim 1, wherein the behavior classifier comprises a neural network model.

6. A method comprising:
   receiving, by a processing device, data representing a set of inputs to a user interface (UI) of a user device, wherein the set of inputs comprises a first input and a second input;
   receiving, by the processing device, first system data representing a first environment of the user device associated with when the first input to the UI was received;
   receiving, by the processing device, second system data representing a second environment of the user device associated with when the second input to the UI was received;
   determining, by the processing device, a user input pattern based on at least a first portion of the data representing the first input, the first system data, at least a second portion of the data representing the second input, and the second system data;
   determining, by the processing device, a behavior classifier value of the user input pattern exceeds a threshold probability value of a stored pattern of UI inputs; and
   causing, by the processing device, additional inputs to the UI to occur to complete the stored pattern without interaction by the user.

7. The method of claim 6, wherein the data representing the set of inputs to the UI of the user device comprise one or more of: data representing an input to a touchscreen of the user device, data representing an input to a keyboard of the user device, data representing an input to a mouse of the user device, data representing a vocal command to a microphone of the user device, or data representing a rotational movement sensed by an inertial sensor of the user device.

8. The method of claim 6, wherein the first system data comprises a time of day the first input was received, a day of week the first input was received, a location of the user device associated with when the first input was received, an orientation of the user device associated with when the first input was received, or weather information for a location of the user device associated with when the first input was received.

9. The method of claim 6, further comprising registering a listening service with device drivers of the user device, the listening service to record the first portion of the data representing the first input to the UI of the user device and report the first system data.

10. The method of claim 6, further comprising subsequent to executing the additional inputs, prompting a user of the user device with information regarding the stored pattern and determining the user agrees to completion of the stored pattern by the user device.

11. The method of claim 6, wherein determining the behavior classifier value of the user input pattern exceeds the threshold probability value of matching the stored pattern further comprises:

analyzing at least a portion of the data, the first system data, and the second system data associated using a behavior classifier trained to identify the stored pattern.

12. The method of claim 11, wherein the behavior classifier comprises a k-means clustering.

13. The method of claim 6, wherein the user device is at least one of an electronic book reader, a cellular telephone, a personal digital assistant, a portable media player, a tablet computer, or a netbook.

14. A user device comprising:

a memory; and a processing device communicably coupled to the memory, the processing device to:

receive data representing a set of inputs to a user interface (UI) of the user device, wherein the set of inputs comprises a first input and a second input;

receive first system data representing a first environment of the user device associated with when the first input to the UI was received;

receive second system data representing a second environment of the user device associated with when the second input to the UI was received;

determine a user input pattern based on at least a first portion of the data representing the first input, the first system data, at least a second portion of the data representing the second input, and the second system data;

determine a behavior classifier value of the user input pattern exceeds a threshold probability value of a stored pattern of UI inputs; and cause additional inputs to the UI to occur to complete the stored pattern without interaction by the user.

15. The user device of claim 14, wherein the subset set of UI inputs comprise UI inputs received in a previous predetermined number of minutes.

16. The user device of claim 14, wherein the subset set of UI inputs comprise a previously-received predetermined number of UI inputs.

17. The user device of claim 14, wherein the first system data is received from a remote server.

18. The user device of claim 14, wherein the behavior classifier comprises at least one of a support vector machine (SVM), a neural network, a logistic regression classifier, or an ensemble classifier.

19. The user device of claim 14, wherein the threshold value is adjustable by the user of the user device.

20. The user device of claim 14, wherein the user device is an electronic book reader.

21. The user device of claim 14, wherein the user device is a tablet computer.

22. A non-transitory computer readable storage medium including instructions that, when executed by a processing device, cause the processing device to:

receive, by a processing device, data representing a set of inputs to a user interface (UI) of a user device, wherein the set of inputs comprises a first input and a second input;

receive first system data representing a first environment of the user device associated with when the first input to the UI was received;

receive second system data representing a second environment of the user device associated with when the second input to the UI was received;

determine a user input pattern based on at least a first portion of the data representing the first input, the first system data, at least a second portion of the data representing the second input, and the second system data;

determine a behavior classifier value of the user input pattern exceeds a threshold probability value of a stored pattern of UI inputs; and cause additional inputs to the UI to occur to complete the stored pattern without interaction by the user.

23. The non-transitory computer readable storage medium of claim 22, wherein the instructions, when executed by the processing device, cause the processing device to:

prompt a user of the user device with information regarding the stored pattern; and receive agreement from the user to completion of the stored pattern.

24. The non-transitory computer readable storage medium of claim 22, wherein the instructions, when executed by the processing device, cause the processing device to:

analyze at least a portion of the data, the first system data, and the second system data using a k-means clustering trained to determine the behavior classifier value.

* * * * *